United States Patent Office 3,422,156
Patented Jan. 14, 1969

3,422,156
NUCLEAR METHYLATION OF PHENOLS
Matthias Thoma, Waldkraiburg, Upper Bavaria, Germany, assignor to Chemisches Werk Lowi, Inh. M. Thoma, Waldkraiburg, Upper Bavaria, Germany
No Drawing. Filed July 22, 1966, Ser. No. 567,044
Claims priority, application Germany, July 23, 1965, C 36,486
U.S. Cl. 260—621    3 Claims
Int. Cl. C07c 37/16

ABSTRACT OF THE DISCLOSURE

Phenol, alkylated phenols, and dihydroxybenzenes are methylated in the nucleus by reaction in an autoclave with methanol which contains aluminum methylate as catalyst; the water of reaction is continuously entrained with distilled off methanol and fresh methanol is added at the rate at which it is removed.

---

This invention relates to the methylation of the nucleus of hydroxy-aromatic compounds with methanol in the liquid phase.

Generally, the alkylation of phenols is carried out with olefins in the presence of suitable catalysts. This type of nuclear alkylation can be performed with all olefins, starting with ethylene. It is also known that said alkylation reaction takes place more readily with increasing number of carbon atoms of the olefins. For instance, for the preparation of ethyl phenols from ethylene and phenol, much stronger reaction conditions have to be applied than for the preparation of butylated phenols from butylene and phenol. In all these reactions, where olefins and phenols are reacted, nuclear alkylation takes place without the formation of water of reaction, which would affect the action of all Friedel-Crafts catalysts. Inversely, catalysts like the chlorides of aluminum, zinc, iron, or the metals capable of forming salts with hydroxy-aromatic compounds, are particularly suitable for the alkylation of such aromatic compounds with olefins.

It is a principal object of the invention to provide an alkylation process where, in spite of the water of reaction formed, not the ethyl, butyl, etc. phenols but the commercially much more interesting cresols and xylenols are produced.

Other objects and advantages will become apparent from a consideration of the specification and claims.

In accordance with the above objects of this invention, hydroxy-aromatic compounds are methylated in the nucleus by passing therethrough at a temperature of 330 to 420° C. methanol which contains suspended therein aluminum methylate as a catalyst; the methanol which has passed through unreacted, is vaporized.

By the evaporation of the methanol, which contains the water of reaction, said water of reaction is removed, and the methylation of the nucleus can be carried out at will. Thereby, the methanol contains preferably 3 to 10 percent by weight of aluminum methylate. It is possible to continue the formation of alkylated phenols substantially to theoretical yield. By modifying the amount of methanol passed through, the type of alkylation can be influenced to a considerable extent. For instance, if phenol is alkylated with methanol, suitable adjustment of the temperature and the amount of methanol employed allows of producing almost only orthocresol, or to a large extent 2,6-dimethyl phenol, or a major proportion of para-cresol. Particularly trimethylated phenols can be obtained in this way. Suitable hydroxy-aromatic compounds are particularly phenol, alkylated phenols, and dihydroxybenzenes which contain hydrogen in at least one ortho position to the hydroxyl groups, and their nuclear-substituted derivatives.

The following examples are given to illustrate procedures and compositions used in practicing this invention but are not to be construed as limiting the scope thereof in respect of the reaction conditions and compositions to be employed. All figures are given by weight, unless indicated otherwise.

Example 1

1200 kg. of phenol (congealing at 40° C.), 400 kg. of methanol 99%, and 20 kg. of aluminum methylate are placed in an autoclave and heated to 390° C. Then 400 kg. of methanol, which contain 20 kg. of aluminum methylate in suspension, are passed through a metering pressure pump into the bottom of the autoclave within a period of 90 minutes. At the same rate at which methanol is pumped into the autoclave, aqueous methanol is withdrawn by a small fractionating column disposed at the top of the autoclave.

The reaction product removed from the autoclave is freed from the residue by filtration. The amount of residue is 39.0 kg. If the residual methanol is distilled off up to a final temperature of 105° C., then there remain 1280 kg. of a mixture which gas-chromatographically analyzed contains:

| | Kg. |
|---|---|
| First run | 23 |
| Methylphenyl ether | 52 |
| Phenol | 515 |
| Ortho-cresol | 470 |
| 2,6-dimethylphenol | 63 |
| Metaparacresol | 70 |
| 2,4-dimethylphenol | 47 |
| 2,3-dimethylphenol | 21 |
| Trimethyl and higher alkylated phenols | 19 |

The first runs of methylphenyl ether, the phenol still present, and the recovered anhydrous methanol are added to the next batch. The produced water of reaction, a total of 145 kg., is discarded.

Example 2

530 kg. of 97% phenol (balance ortho-cresol), 600 kg. of pure phenol, 70 kg. of first runs plus methylphenyl ether and 400 kg. of 98.5% methanol (recovered from a preceding run) are placed together with 50 kg. of aluminum methylate in an autoclave. In order to prevent settling of the aluminum methylate, the introduction of additional 80 kg. of 98.5% recovered and 320 kg. of pure methanol at the bottom of the autoclave is begun at once. Until the temperature of 395° C. is reached, only about 100 kg. of the methanol are metered in. Subsequently, the balance of about 300 kg. is pumped in, and the same amount of methanol, together with the formed water of reaction, is withdrawn at the same rate from the top of the column placed on the autoclave.

The product discharged from the autoclave is filtered. After separation of 31 kg. of residue, the residual methanol is distilled off in a fractionation column.

There remain 1295 kg. of reaction mixture having the following composition:

| | Kg. |
|---|---|
| First run | 31 |
| Methylphenyl ether | 69 |
| Phenol | 455 |
| Orthocresol | 438 |
| 2,6-dimethylphenol | 120 |
| Metaparacresol | 42 |
| 2,4-dimethylphenol | 80 |
| 2,3-dimethylphenol | 42 |
| Trimethyl and higher alkylated phenols | 20 |

Example 3

For a continuous operation, two autoclaves are connected at top and bottom each by a conduit. One of the autoclaves is equipped with a fractionation column corresponding to a number of theoretical plates of 5-6.

After both autoclaves have been filled once to about 60 percent of their volume with the desired reaction product, both are heated to 400° C. Then a mixture consisting of

| | Percent |
|---|---|
| Phenol | 58 |
| Methanol | 39 |
| Aluminum methylate | 3 | is metered in such a way that 0.6 kg. are passed through per 1 liter of reaction space. The mixture is introduced into one autoclave some centimeters above the bottom. A part, particularly methanol, is passed through a conduit which goes from the top of an autoclave to the bottom of the second autoclave. While a discharge pipe ensures that the reaction mixture in both autoclaves maintains the same liquid level, methanol and the formed water of reaction are continuously discharged over the fractionation column of the second autoclave and condensed in a cooler. After the methanol has been separated from the water by distillation, it is returned to the starting solution. The reaction product is continuously discharged from the second autoclave, condensed by cooling, and then filtered.

After distillation of the methanol, anisol and phenol are obtained by fractional distillation and added, with the methanol, to the starting mixture for further reaction. Subsequently, a mixture remains which is continuously analyzed by gas chromatography and has the following average composition:

| | Percent |
|---|---|
| Orthocresol | about 66 |
| 2,6-dimethylphenol | do 12 |
| Metaparacresol | do 8 |
| 2,4-dimethylphenol | do 8 |
| 2,3-dimethylphenol | 3 |
| Higher alkylated phenols | 3 |

By varying the composition of the starting mixture, reaction temperature, and reaction time, the proportions of the components of the final product can be varied to a considerable extent. This applies particularly for the 2,6 and 2,4 dimethyl phenol and the trimethylated phenols.

I claim:

1. A method for the nuclear methylation of a hydroxy-aromatic compound selected from the group consisting of phenol, alkylated phenols, and dihydroxybenzenes which have a hydrogen atom in at least one of the positions ortho and para to a hydroxyl group, comprising passing methanol containing in suspension aluminum methylate as catalyst through said hydroxy-aromatic compound, said hydroxy-aromatic compound being maintained in the liquid phase at a temperature of 330 to 420° C. distilling off during the reaction aqueous methanol at about the same rate as methanol is introduced, thereby removing also the water of reaction, and recovering methylated reaction products from the reaction zone.

2. The method as claimed in claim 1 comprising discharging at the rate at which hydroxy-aromatic compound is introduced, reacted mixture from the bottom of the reaction zone so as to maintain the level of the reacting liquid in the reaction zone.

3. The method as claimed in claim 1 comprising separating the distilled off methanol from the water of reaction and admixing the same, together with the methylphenyl ether and unreacted phenol obtained by fractional distillation of the reaction product of a preceding run with the liquid hydroxy-aromatic compound and subjecting said mixture to the reaction set forth in claim 1.

References Cited

UNITED STATES PATENTS 2,448,942  9/1948  Winkler et al. _____ 260—621

LEON ZITVER, *Primary Examiner.*

H. ROBERTS, *Assistant Examiner.*

U.S. Cl. X.R.

260—624